United States Patent
Mekenkamp et al.

(10) Patent No.: US 7,570,871 B2
(45) Date of Patent: Aug. 4, 2009

(54) CONTINUE RECORDING CHANNEL FEATURE FOR PERSONAL VIDEO RECORDER

(75) Inventors: Gerhardus E. Mekenkamp, Valkenswaard (NL); Mauro Barbieri, Eindhoven (NL); Igor W. F. Paulussen, Nuenen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1153 days.

(21) Appl. No.: 10/292,717

(22) Filed: Nov. 12, 2002

(65) Prior Publication Data

US 2004/0091249 A1   May 13, 2004

(51) Int. Cl.
*H04N 7/08* (2006.01)
*H04N 5/91* (2006.01)

(52) U.S. Cl. ........................................... 386/92
(58) Field of Classification Search ................. 386/92, 386/83, 12, 46
See application file for complete search history.

(56) References Cited

U.S. PATENT DOCUMENTS

| | | | |
|---|---|---|---|
| 6,052,155 A | | 4/2000 | Cherrick et al. |
| 6,324,338 B1 * | | 11/2001 | Wood et al. ............... 386/83 |
| 6,766,100 B1 * | | 7/2004 | Komar et al. ............... 386/46 |
| 7,027,716 B1 * | | 4/2006 | Boyle et al. ............... 386/83 |
| 2001/0008427 A1 | | 7/2001 | Seo |
| 2002/0168178 A1 * | | 11/2002 | Rodriguez et al. ........... 386/92 |
| 2003/0110511 A1 * | | 6/2003 | Schutte et al. ............. 725/131 |

FOREIGN PATENT DOCUMENTS

| | | |
|---|---|---|
| DE | 42 25 052 A1 | 2/1994 |
| EP | 0 677 060 A2 | 10/1995 |
| WO | WO 00/54499 | 9/2000 |

* cited by examiner

*Primary Examiner*—Marsha D Banks Harold
*Assistant Examiner*—Oluwaseun A Adegeye

(57) ABSTRACT

A PVR (A) includes an output (70) wherein a TV channel selected for viewing is output, and a storage device (20) that selectively stores a channel indicator (24) therein. A user interface (60) provides means for selectively loading the storage device (20) with a desired channel indicator (24), and means for selecting a TV channel to be sent to the output (70). A buffer (82) is also included. The buffer (82) automatically records the TV channel output for viewing if the storage device (20) has no channel indicator (20) stored therein, and automatically records that TV channel indicated by the channel indicator (24) when one is stored in the storage device (20) even when the TV channel output for viewing is selected to be different from the TV channel indicated by the channel indicator (24).

20 Claims, 3 Drawing Sheets

CONTINUE RECORDING CHANNEL FEATURE FOR PERSONAL VIDEO RECORDER

BACKGROUND OF THE INVENTION

The present invention relates to the television (TV) viewing and/or recording arts. It finds particular application in conjunction with a personal video recorder (PVR), and will be described with particular reference thereto. However, it is to be appreciated that the present invention is also amenable to other like applications including various types of media recording and/or playback devices.

Multimedia recording and playback devices such as video cassette recorders (VCRs), digital video (or versatile) disc (DVD) players, cassette players, compact disc (CD) players and, in particular, PVRs are known. At times, users of such devices desire to be able to pause, rewind, slow or otherwise manipulate playback. For example with respect to pausing playback, previously, this has been done by the user supplying an appropriate instruction to halt playback, then beginning the playback again, at the point at which the playback was halted, when the user supplies another appropriate instruction. For pre-recorded media (e.g., the video on a DVD), the implementation of particular playback manipulations is straightforward since all of the data is already stored on a storage medium and it can readily be accessed as desired. For example, the capability to pause the playback of pre-recorded media has been widely implemented in consumer electronics equipment.

The problem is more complex when implementing playback manipulation for media that is not pre-recorded, but, rather, is represented by data or a signal that is only momentarily available. This is the case, for example, with "live" or real time broadcasting of TV or radio, or with a streaming type of input over a network such as the Internet or a local wireless network.

Nevertheless, PVR systems which record media to a hard disk drive, memory or other like storage device have been developed which have certain playback manipulation features, e.g., pause, rewind, etc. In the case of live or real time broadcasts or the like, to achieve these manipulations, PVRs typically employ what is known as a "time-shift buffer" (TSB). For example, the TSB allows a user to pause a TV broadcast, optionally rewind a TV broadcast to perform an instant replay, slow playback, continue viewing the broadcast from a given point forward, etc.

Traditional PVRs operate such that the TSB buffer is always recording the channel that is selected for viewing. With a fixed buffer size, the oldest data in the buffer is continuously discarded. For example, a typical PVR implementation may offer a fixed TSB capable of storing up to a total of half an hour's worth of recorded media. Accordingly, the data within that moving window or period (e.g., the most recent half hour) is available to be accessed as desired to perform a selected playback manipulation.

However, previously developed PVRs only buffer the channel currently selected for viewing. When the selected viewing channel is changed, the TSB is then automatically loaded with data from the newly selected channel. In this manner, the TSB is essentially no more than a historical record of that which was presented for viewing. Upon changing viewing channels, data from the prior channel is no longer being recorded. In certain implementations, the TSB may be cleared completely when channels are changed so as to maximize buffering room for the newly selected viewing channel.

A TV viewing habit known as "channel surfing" or "zapping," typically involves the rapid and repeated changing of channels selected for viewing. Often, this type of surfing is engaged in during commercial breaks in a TV program that is otherwise of predominant interest to the user, but it may be engaged in at other times as well. For example, during a commercial break or otherwise, the user may wish to momentarily view one or more secondary channels of interest, e.g., to check the score of a sporting event, catch a news update, merely out of curiosity, or for any other reason. Yet, the user still would like not to miss portions of the program on the predominate channel of interest. However, this undesired outcome may in fact result at times. For example, assume the user does not return to the predominate channel of interest prior to the expiration of a commercial break, then some portion of the program immediately following the commercial break is missed.

The aforementioned PVR implementations do not provide a solution to the foregoing situation insomuch as they only buffer the channel currently selected for viewing. Being that the TSB is only loaded with data from channels which are selected for viewing, any data, events, programs or portions thereof on a channel not selected for viewing that were undesirably missed are not captured in the buffer to be later accessible. Using the above example, because the predominate channel of interest was not returned to as the selected viewing channel until after the expiration of the commercial break, that portion of the program immediately following the commercial break (i.e., between the end of the break and returning to the channel) was not captured in the TSB. Because it was not capture in the TSB, it cannot be later accessed. The user has therefore missed or lost a portion of the program that they may otherwise have wanted to view. Accordingly, channel surfing (i.e., the selecting of one or more secondary channels for viewing) cannot be safely engaged in without the risk of loosing or missing some portion of what is being broadcast on a channel which is not at the time selected for viewing but is otherwise of predominate interest.

The present invention contemplates a new and improved PVR device and/or technique which overcomes the above-referenced problems and others.

SUMMARY OF THE INVENTION

In accordance with one aspect of the present invention, a PVR is provided. The PVR includes an output wherein a TV channel selected for viewing is output, and a storage device that selectively stores a channel indicator therein. A user interface provides means for selectively loading the storage device with a desired channel indicator, and means for selecting a TV channel to be sent to the output. A buffer is also included. The buffer automatically records the TV channel output for viewing if the storage device has no channel indicator stored therein, and automatically records that TV channel indicated by the channel indicator when one is stored in the storage device even when the TV channel output for viewing is selected to be different from the TV channel indicated by the channel indicator.

In accordance with another aspect of the present invention, a method of operating a media receiving/outputting device includes: receiving a media signal; tuning the media signal to a first channel selected for outputting; outputting the first channel; effecting a setting of the device to a mode, said mode being selected from a first mode and a second mode; storing a valid channel indicator in an allotted location when the device is set to the second mode, said channel indicator identifying a second channel of the media signal; tuning the media signal to the second channel; determining if the device is in the first mode or the second mode; and, routing to a destination one of: (i) the first channel, when the device is in the first mode; and, (ii) the second channel, when the device is in the second mode.

In accordance with another aspect of the present invention, a media receiving/outputting device includes: reception means for receiving a media signal; first tuning means for tuning the media signal to a first channel selected for outputting; output means for outputting the first channel; mode setting means for effecting a setting of the device to a mode, said mode being selected from a first mode and a second mode; storage means for storing a valid channel indicator in an allotted location when the device is set to the second mode, said channel indicator identifying a second channel of the media signal; second tuning means for tuning the media signal to the second channel; detecting means for determining if the device is in the first mode or the second mode; and, routing means for routing to a destination one of: (i) the first channel, when the device is in the first mode; and, (ii) the second channel, when the device is in the second mode.

One advantage of the present invention is the option to safely channel surf without the risk of missing a desired portion of a TV program on a channel of predominate interest.

Another advantage of the present invention is the option to be automatically presented with real time contact and/or cues as to the content on a predominate channel of interest even when it is not selected as the main viewing channel.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and/or in various steps and arrangements of steps. The drawings are only for purposes of illustrating preferred embodiments and are not to be construed as limiting the invention.

DETAILED DESCRIPTION OF THE PREFERRED EMBODIMENT(S)

Figure 1:
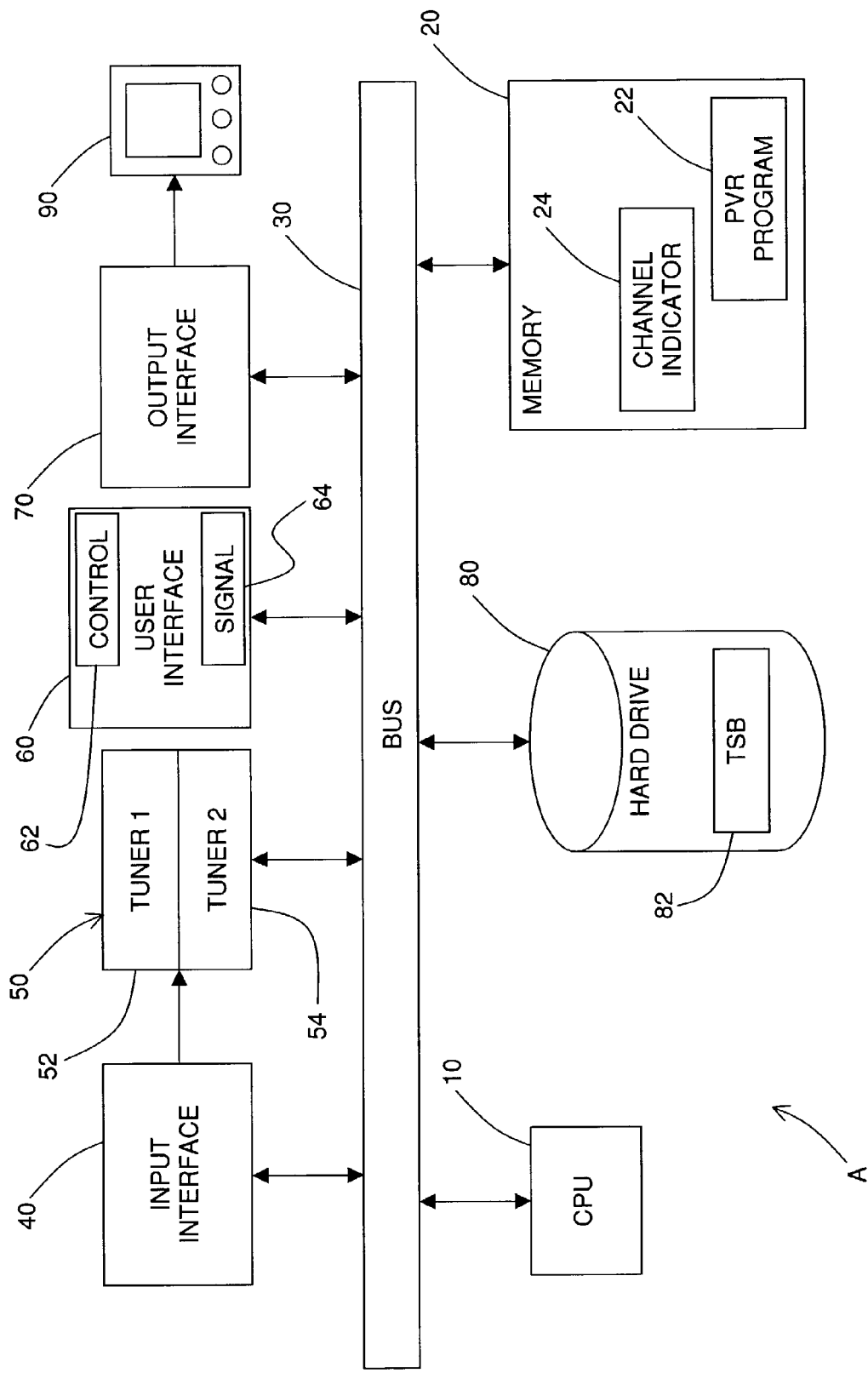
FIG. 1 is a diagrammatic illustration of an exemplary PVR in accordance with aspects of the present invention.

With reference to FIG. 1, a PVR A operates under the control of a central processing unit (CPU) 10 running a PVR program 22 residing in a memory 20. Optionally, memory 20 may be another suitable type of storage device and CPU 10 may be another suitable type of controller. The CPU 10 and memory 20 are operatively connected via a common bus 30 that also operatively interconnects other PVR components, including: an input interface 40, a receiver 50, a user interface 60, an output interface 70, and a hard drive 80. Of course, the bus 30 may also optionally be another suitable type of signal or data routing device. Additionally, while the component of the PVR A are shown separately, it is to be appreciated that any of them and/or their functions may optionally be combined and/or divided as appropriate for specific applications or embodiment. It is to be appreciate further that the particular components and/or their functions are alternately implemented via a hardware configuration, a software configuration, or a combination of both.

A TV signal from a source (not shown) is input into the PVR A via the input interface 40. The TV signal source is optionally an air antenna, cable, satellite dish, or the like. The signal input into the input interface 40 is received by the receiver 50. The illustrated embodiment shows a dual channel receiver 50 including a pair tuners 52 and 54, nominally labeled tuner 1 and tuner 2, respectively. Each tuner, under the control of the CPU 10, is independently tunable to a given TV channel. Also under the control of the CPU 10, channels from the receiver 50 are then routed to their respective destinations, e.g., over the bus 30. A first destination is the output interface 70 where channels selected for viewing are output to a TV 90 or other suitable display or output device. A second destination is a TSB 82 on the hard drive 80 where channel content is at least temporarily recorded and/or stored such that it may be later accessed for playback and/or to perform selected playback manipulations. Optionally, hard drive 80 may be another suitable type of storage device including, but not limited to, an optical data storage device or drive such as a rewritable DVD device or a blue-laser-based optical disc system (commonly known as Blu-Ray).

Also shown in FIG. 1, is the user interface 60 through which a user selects and/or inputs desired commands and/or instructions to the PVR A, including, e.g., playback instructions, selected playback manipulations, channel viewing selections, powering on and off of the PVR A, volume and other audio controls (e.g., balance, bass, treble, sound enhancement, etc.), picture setting controls (e.g., tint, color, contrast, brightness, etc.), accessing and using the PVR's recording features, accessing and using an electronic program guide (EPG), and all other communications from the user to the PVR A. The user interface 60 is employed by the user to operate of the PVR A in a desired manner and control the functions thereof. The user interface 60 is optionally implemented as a remote control, a front panel keypad, a graphical user interface (GUI), other known user interfaces, or a combination of any one or more of these.

In its normal operating mode, the PVR A operates essentially like a known or conventional PVR, i.e., the same channel is routed from the receiver 50 to both the output interface 70 and the TSB 82 on hard drive 80. Accordingly, for example, when a user pauses otherwise live or real time TV, the PVR A freezes the frame at the output interface 70, while continuing to direct the channel via bus 30 to the time-shift buffer 82 on the hard disk 80 so that the channel content may be loaded therein. When the user ends the pause, the PVR A causes the stored content in the time-shift buffer 82 to be routed from the hard disk 80 over the bus 30 to the output interface 70. At the same time or nearly the same time, the incoming channel content from the input interface 40 and receiver 50 is written to the time-shift buffer 82 for viewing at an appropriate time. Optionally, in order for the time-shift buffer 82 to not grow to an unacceptably large size, it is concurrently trimmed to maintain a selected size. If a user prefers, content from the time-shift buffer 82 that has been delayed can be transmitted to the output interface 70 in an accelerated mode so that, in time, the user is outputting essentially real time content without a time delay. It is to be appreciated that the forgoing example is offered merely to illustrate one feature (namely pausing) of normal mode operation, and that other known PVR features and/or known playback manipulations are contemplated.

In the normal operation mode, the PVR A uses the TSB 82 to keep a limited historical record of captured content which was presented for viewing so that it may later be accessed for playback manipulations or otherwise. That is to say, the channel loaded into the TSB 82 is the same as the channel selected for viewing when the PVR A is in the normal operation mode.

Continuing with reference to FIG. 1, the user interface 60 also includes a control 62 whereby the user can as desired selectively designate a particular channel or content thereon as being of predominant interest. Operation of the PVR A in this mode shall be referred to nominally herein as the "predominant selection mode" (PSM), as opposed to the normal mode. Unlike the normal mode, in PSM the same channel is not always routed to both the output interface 70 and the TSB 82. Rather, at times, the channel routed to the output interface 70 may be different from the channel routed to the TSB 82. Engaging or activation of the PSM, e.g., via control 62 on the user interface 60, causes a selected or desired channel indicator 24 to be loaded and/or stored in an allocated location within memory 20. Optionally, the channel indicator 20 can be loaded and/or stored in an independent memory or other suitable storage device. The channel indicator 24 identifies a corresponding channel which is then routed to the TSB 82 regardless of which channel is selected for viewing. Accordingly, channel surfing or otherwise changing the selection of the channel to be routed to the output interface 70 does not alter or effect the content loaded into the TSB 82 which continues to record the channel of predominant interest as indicated by the channel indicator 24. In this manner, channel surfing (i.e., the selecting of one or more secondary channels for viewing) can be safely engaged in without the risk of loosing or missing some portion of what is on a channel that is not at the time selected for viewing but is otherwise of predominate interest.

The user interface 60, in addition to being an input device, is also optionally an output device including a signal 64 used to communicate operating conditions of the PVR A to the user. The signal 64 is optionally visual or auditory or both. The operating conditions communicated to the user by the signal 64 include, but are not limited to, any one or more of the following: the current operational mode; a warning when the TBS 82 is loaded to or near its full capacity; when appropriate, the channel indicator 24 stored in memory 20; miscellaneous messages of interest to the user; etc.

Figure 2:
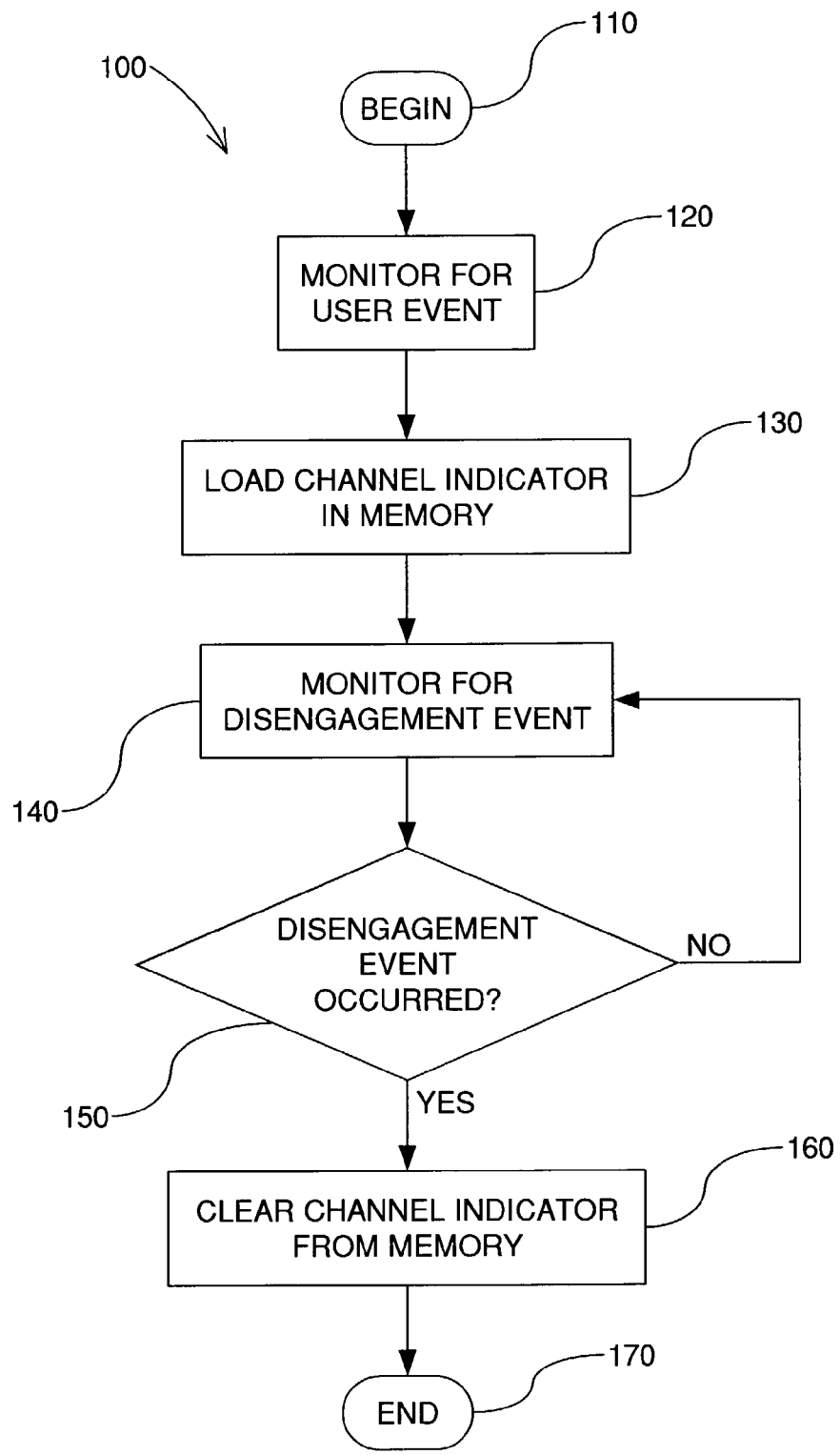
FIG. 2 is a flow chart illustrating an exemplary routine/process for setting an operational mode of the PVR of FIG. 1.

With added reference now to FIG. 2, an exemplary routine or process 100 for mode selection starts at beginning 110, and is conducted by and/or carried out under the control of the CPU 10 running the PVR program 22 residing in memory 20. At step 120, the PVR A is monitored for a determined user event which indicates the user desires to engage or activate the PSM or otherwise desires to designate a channel or content thereon as being of predominate interest, e.g., the event may include operation of the control 62 on the user interface 60, a scheduled EPG event, etc. At step 130, the PVR A enters PSM, and the channel indicator 24 corresponding to the user's selected or otherwise desired channel is loaded and/or stored in memory 20. Optionally, the channel indicator 24 loaded and/or stored in the memory 20 corresponds to the current channel selected for viewing at the time of PSM engagement, or it may be manually entered by the user via the user interface 60, or it may be selected currently or prospectively from an EPG, or it may otherwise be determined.

At step 140, the PVR A is monitored for a determined disengagement event which indicates that PSM is no longer to be active or engaged. Disengagement events optionally include, but are not limited to, any one or more of following: the user's operation of the control 62 on the user interface 60 or other indicative manipulations of the user interface 60; powering off the PVR A; detection of the end of particular channel content (e.g., the end of a given program) as may optionally be determined from an EPG; when the TSB 82 is full; etc. At decision step 150, it is determined if a disengagement event has occurred, if "no" the process 100 loops back to step 140, if "yes" the process continues on to step 160. At step 160, the PSM is deactivated or disengaged, and the channel indicator 24 is deleted, clearer or otherwise removed from the allocated location in memory 20. The PVR A accordingly been returned to the normal mode, and the routine/process 100 ends at step 170. Of course, the routine/process 100 is repeatedly run periodically during operation of the PVR A to continually set, update and/or otherwise determine the appropriate operational mode for the PVR A.

Figure 3:
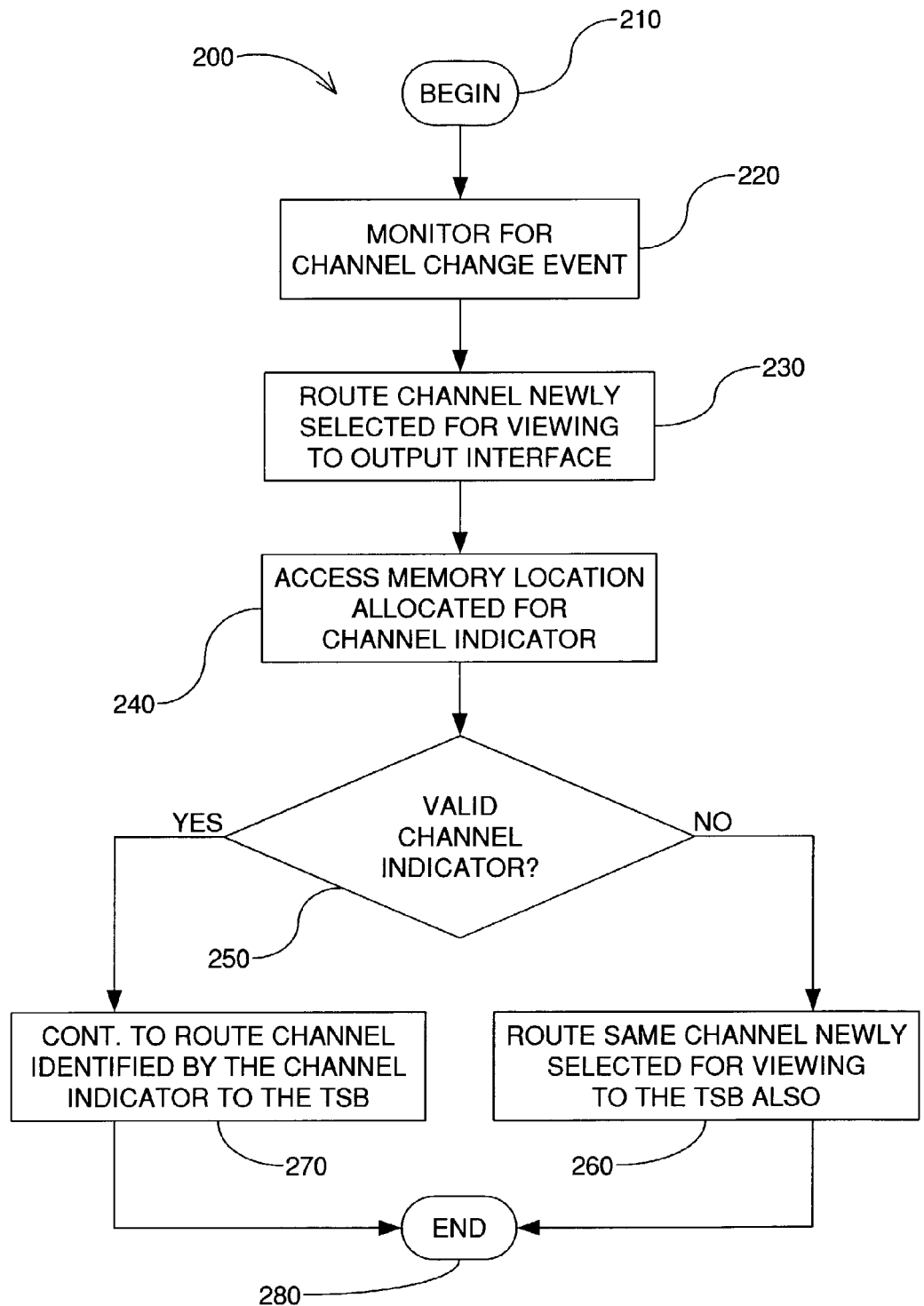
FIG. 3 is a flow chart illustrating an exemplary routine/process for channel tuning and routing in the PVR of FIG. 1.

With added reference now to FIG. 3, an exemplary routine or process 200 for channel selection and/or routing starts at beginning 210, and is conducted by and/or carried out under the control of the CPU 10 running the PVR program 22 residing in memory 20. At step 220, the PVR A is monitored for a determined channel changing event which indicates a change in the channel being selected for viewing, e.g., the event may include operation of the user interface 60, an EPG scheduled channel change, etc. At step 230, the channel newly selected for viewing is routed to the output interface 70. At step 240, the location in memory 20 allocated for the channel indicator 24 is queried, checked or otherwise accessed. At decision step 250, it is determined if a valid channel indicator 24 is contained in the allocated location of memory 20. If the result of decision step 250 is "no" (i.e., the PVR A is in normal operation mode), then at step 260 the channel newly selected for viewing is also routed to the TSB 82. Alternately, if the result of decision step 250 is "yes" (i.e., the PVR A is in PSM), then at step 270 the channel being routed to the TSB 82 does not change to the channel newly selected for viewing, rather, the channel currently being routed to the TSB 82 continues to be routed to the TSB 82. The routine/process 200 concludes at end step 280. Of course, the routine/process 200 is repeatedly run periodically during operation of the PVR A to continually set, update and/or otherwise determine the appropriate channel selection and/or routing for the PVR A.

Channel selection and/or routing is preferably carried out and/or regulated by the CPU 10 running PVR program 22 residing in memory 20. The CPU 10 controls the tuning of the tuners 52 and 54, and routes of the respective output channels over the bus 30 to their appropriate destinations in accordance with the operational mode of the PVR A.

Various combinations of routing and tuning schemes are capable of achieving the appropriate result for the selected operational mode of the PVR A. In one option, tuner 1 52 is operatively connected to the output interface 70 and tuner 2 54 is operatively connected to the TSB 82. In this case, the CPU 10 is operative to: (i) in response to the user interface 60 or otherwise, tune tuner 1 52 to the TV channel selected for viewing; (ii) tune tuner 2 54 to the same channel as tuner 1 52 when the PVR A is in normal mode or no valid channel indicator 24 is contained in the location allocated therefor; and, (iii) tune tuner 2 54 to that TV channel indicated by the channel indicator 24 when the PVR A is in PSM or a valid channel indicator 24 is contained in the location allocated therefor. Alternately, the CPU 10 is operative to: (i) in response to the user interface 60 or otherwise, tune tuner 1 52 to the TV channel selected for viewing and operatively connect tuner 1 52 to the output interface 70; (ii) when no valid channel indicator 24 is contained in the location allocated therefor or the PVR A is in normal mode, also operatively connect tuner 1 52 with the TSB 82; and, (iii) when a valid channel indicator 24 is contained in the location allocated therefor or the PVR A is in PSM, tune tuner 2 54 to that TV channel indicated by the channel indicator 24 and operative connect tuner 2 54 with the TSB 82.

It is to be appreciated that various alterations to and/or modifications of the above described exemplary PVR A are contemplated. For example, the devices and/or techniques described herein are equally applicable to media types other than TV video. In one alternate embodiment, a multimedia recording/playback device processes one or more media types, e.g., radio broadcasts, other transient or non-persistent media, momentarily broadcast data, etc., in essentially the same manner as described herein.

Further, while the above has been described with reference to two particular destinations (i.e., the first destination being the output interface 70 wherein a channel selected for viewing is output, and the second destination being the TSB 82), alternate embodiments contemplate additional and/or different destinations. In one embodiment, where the TV 90 has a picture-in-picture (PIP) feature, the other destination is the PIP in addition to or in lieu of the TSB 82. More specifically, when in PSM, in addition to or in lieu of the channel identified by the channel indicator 24 being routed to the TSB 82, the channel identified by the channel indicator 24 is routed to the PIP. Preferably, in this embodiment, when the device is in PSM (i.e., the allocated location in memory 20 contains a valid channel indicator 24) and the viewing channel is changed, the PIP is automatically opened and made to receive the channel identified by the channel indicator 24. In this manner, the user is automatically presented with real time visual contact and/or cues as to the content on the predominate channel of interest. Accordingly, for example, a user channel surfing during a commercial break can see when the commercial break ends so as to timely return to the predominate channel of interest without missing portions of the program. Note that in the normal mode, the PIP is preferably not automatically opened upon changing the viewing channel.

Optionally, upon returning the main viewing channel to the predominate channel of interest (i.e., the channel identified by the channel indicator 24), the PIP is automatically closed. An additional optional feature automatically returns the main viewing channel to the predominate channel of interest upon detection of the end of a commercial break. Preferably, the automatic return feature may be selectively activated or deactivated by the user. In another alternative, the PIP is not automatically opened as soon as the user begins channel surfing in PSM, rather, automatic opening of the PIP occurs when the end of a commercial break is detected.

It is also to be appreciated that the PVR A is optionally a stand alone device or it may be incorporated in a variety of different devices. For example, the PVR A is optionally incorporated in TV 90, a computer, a satellite TV receiver, a cable box or other suitable multimedia recording/playback device. Alternately, one or more elements of the PVR A is incorporated in a separate device which is optionally under the control of, or controllable through, the PVR A. For example, either or both of tuners 1 and 2, is optionally incorporated in another separate device such that the input interface 40 receives pre-tuned channels therefrom.

In one particular embodiment, one tuner (say tuner 1) is incorporated in a separate device and the other (say tuner 2) is incorporated in the PVR A. A suitable routing/tuning scheme for this embodiment includes operatively connecting tuner 1 (from the input interface 40) to the output interface 70 and tuner 2 (from the receiver 50) to the TSB 82. In this case, the CPU 10 is operative to: (i) detect the channel from tuner 1 received by the input interface 40; (ii) tune tuner 2 to the same channel as tuner 1 when the PVR A is in normal mode or no valid channel indicator 24 is contained in the location allocated therefor; and, (iii) tune tuner 2 to that channel indicated by the channel indicator 24 when the PVR A is in PSM or a valid channel indicator 24 is contained in the location allocated therefor. In an alternate tuning/routing scheme, the CPU 10 operates to: (i) operatively connect tuner 1 to the output interface 70; (ii) when no valid channel indicator 24 is contained in the location allocated therefor or the PVR A is in normal mode, also operatively connect tuner 1 with the TSB 82; and, (iii) when a valid channel indicator 24 is contained in the location allocated therefor or the PVR A is in PSM, tune tuner 2 to that TV channel indicated by the channel indicator 24 and operative connect tuner 2 with the TSB 82.

In either case, note that the PVR A does not control or tune tuner 1 which is incorporated in the separate device. Rather, in the first tuning/routing scheme, the PVR A detects the channel received from tuner 1 and selectively tunes tuner 2 to either the detected channel or the channel identified by the channel indicator 24 depending on the operational mode of the PVR A. In the second tuning/routing scheme, the PVR A does pick between two channels for the tuning of tuner 2, but instead adjusts the channel routing pattern such that either tuner 1 (tuned to the channel selected for viewing) is routed to the TSB 82 or tuner 2 (tuned to the channel identified by the channel indicator) is routed to the TSB 82 depending on the operational mode of the PVR A. Accordingly, the separate device is tuned independently to the channel that is to be selected for viewing, and the PVR A routes that channel to the output interface 70. For example, the separate device may be a VCR incorporating a tuner, namely, tuner 1, the output of which is supplied to the input interface 40. The user then chooses the channel selected for viewing by independently operating the VCR in the appropriate manner. The PVR A then, in response to the detected channel being input into the input interface 40, the channel identified by the channel indicator 24 and/or the currently selected operational mode (i.e., normal mode or PSM), simply regulates the tuning of the tuner in the receiver 50 (namely, tuner 2) and/or controls the routing of channels over the bus 30 to appropriate destinations.

In another example, the user interface 60 is optionally implemented as a universal remote which controls a plurality of devices including the PVR A. The universal remote may also optionally coordinate and/or relatively regulate the functioning of the plurality of devices so as to selectively achieve both the normal operational mode and PSM as desired by the user.

Of course, notwithstanding the foregoing, it is to be understood that when output of a time-shifted playback is desired or selected (i.e., output of the TSB 82 is desired or selected), the CPU 10, running the PVR program 22 residing in memory 20, routes content over the bus 30 from the TSB 82 to the output interface 70.

The invention has been described with reference to preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described preferred embodiments, the invention is now claimed to be:

1. A media receiving/outputting device comprising:
reception means for receiving a media signal; first tuning means for tuning the media signal to a first channel selected for outputting;
output means for outputting the first channel;

mode setting means for effecting a setting of the device to a mode, said mode being selected from a first mode and a second mode;

storage means for storing a valid channel indicator in an allotted location when the device is set to the second mode, said channel indicator identifying a second channel of the media signal;

second tuning means for tuning the media signal to the second channel;

setting means for setting the device in the first mode or the second mode by setting the device in the second mode if the valid channel indicator is stored in the allotted location and setting the device in the first mode if the valid channel indicator is not stored in the allotted location; and, routing means for routing to a given recording device only: (i) the first channel, when the device is in the first mode; and only, (ii) the second channel, when the device is in the second mode.

2. The device of claim 1, wherein the storage means is a memory.

3. The device of claim 1, wherein the given recording device is a buffer on a data storage device selected from a hard drive or an optical drive.

4. The device of claim 1, wherein the routing means comprises a bus.

5. A personal video recorder (PVR) comprising:
an output from which a television channel selected for viewing is output;
a storage device that selectively stores a channel indicator therein;
a user interface which selectively loads the storage device with a desired channel indicator, and selects a TV channel to be sent to the output; and,
a given recording device, said given recording device automatically recording one of only the TV channel output for viewing if the storage device has no channel indicator stored therein, and said given recording device automatically recording only that TV channel indicated by the channel indicator when one is stored in the storage device even when the TV channel output for viewing is selected to be different from the TV channel indicated by the channel indicator.

6. The PVR of claim 5, further comprising:
a first tuner for tuning a received TV signal to a first TV channel; and,
a second tuner for tuning the received TV signal to a second TV channel.

7. The PVR of claim 6, further comprising:
a controller which regulates at least one of tuning of the first and second tuners and routing of the first and second channels to the given recording device and output.

8. The PVR of claim 7, having said first tuner operatively connected to the output and the second tuner operatively connected to the given recording device, wherein said controller is operative to:
(i) in response to the user interface, tune the first tuner to the TV channel selected to be sent to the output;
(ii) tune the second tuner to the same channel as the first tuner when no channel indicator is stored in the storage device; and,
(iii) tune the second tuner to that TV channel indicated by the channel indicator when one is stored in the storage device.

9. The PVR of claim 7, wherein said controller is operative to:
(i) in response to the user interface, tune the first tuner to the TV channel selected to be sent to the output and operatively connect the first tuner to the output;
(ii) when no channel indicator is stored in the storage device, also operatively connect the first tuner with the given recording device; and,
(iii) when a channel indicator is stored in the storage device, tune the second tuner to that TV channel indicated by the channel indicator and operative connect the second tuner with the given recording device.

10. The PVR of claim 5, wherein the storage device is a memory.

11. The PVR of claim 5, wherein the given recording device is a data storage device selected from a hard drive or an optical drive.

12. The PVR of claim 5, wherein the user interface is a remote control.

13. The PVR of claim 5, wherein the PVR is incorporated in at least one of a TV, a cable box, and a satellite TV receiver.

14. A method of operation of a media receiving/outputting device comprising:
(a) receiving a media signal;
(b) tuning the media signal to a first channel selected for outputting;
(c) outputting the first channel;
(d) effecting a setting of the device to a mode, said mode being selected from a first mode and a second mode by effecting the device to be in the second mode if the valid channel indicator is stored in the allotted location and effecting the device to be in the first mode if the valid channel indicator is not stored in the allotted location;
(e) storing a valid channel indicator in an allotted location when the device is set to the second mode, said channel indicator identifying a second channel of the media signal;
(f) tuning the media signal to the second channel;
(g) determining if the device is in the first mode or the second mode; and,
(h) routing to a given recording device one of only:
(i) the first channel, when the device is in the first mode; and only,
(ii) the second channel, when the device is in the second mode.

15. The method of claim 14, wherein the media signal is a television (TV) signal or a radio signal.

16. The method of claim 14, wherein the given recording device is a picture-in-picture (PIP) window of a television (TV) or a buffer.

17. The method of claim 14, wherein setting of the device to the second mode comprises loading a valid channel indicator into the allotted location.

18. The method of claim 14, wherein setting of the device to the first mode comprises clearing the allotted location.

19. The method of claim 14, wherein step (g) comprises checking the allotted location for a valid channel indicator.

20. The method of claim 14, wherein the device is a television (TV), a personal video recorder (PVR), a cable box, a radio or a satellite TV receiver.

* * * * *